Patented Sept. 16, 1924.

1,508,457

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

PYROXYLINE AND METHOD OF MAKING THE SAME.

No Drawing.   Application filed August 26, 1922.   Serial No. 584,554.

*To all whom it may concern:*

Be it known that I, WILLIAM G. LINDSAY, a citizen of the United States, residing at Newark, in the county of Essex and State of New Jersey, have invented certain new and useful Improvements in Pyroxyline and Methods of Making the Same, of which the following is a specification.

This invention relates to a pyroxyline product and in particular to a thermo plastic pyroxyline product having properties similar to "celluloid"; and it also relates to the process of making the same. The chief object of the invention is to produce a variety of pyroxyline having definite solubility and viscosity characteristics, adapting it to be more readily worked with various solvents and in particular with camphor substitutes such as tricresylphosphate and the like.

As is well known to those skilled in the art, the commercial product known as celluloid is made by combining pyroxyline with camphor by means of solvents which become active through the peculiar plasticizing effect of camphor in the presence of these solvents. These are usually ethyl and methyl alcohol and are used either alone or in various combinations together. The methyl alcohol is a solvent of the pyroxyline in itself and when used with ethyl alcohol which is a solvent of pyroxyline in the presence of the camphor, acts to promote the solvent action of the ethyl alcohol and also to increase its volatility, thus decreasing or shortening the rate of evaporation of the solvent mixture. Satisfactory commercial products are made with the employment of either solvent alone although when market conditions are favorable, it is usual to use a combination of both solvents. It has also become common practice to employ various other solvents such as fusel oil, amyl acetate and the like, but these solvents, which alone may be either solvents of the pyroxyline or become so only in the presence of the camphor, are usually employed in but limited amounts and as a rule only for very highly specialized effects, where definite degrees of moldability, toughness, flexibility and the like are the aim.

In the production of thermo plastic compounds in combination with substances other than camphor, of which the aromatic phosphates are an example, more particularly, the liquid aromatic phosphates, it has been found that the solvents ordinarily employed in the production of camphor pyroxyline compounds are not entirely suitable, or in such cases where they may be employed, it has been found that it is necessary to increase the amount of these solvents, such as ethyl and methyl alcohol, or combinations of the two in order to bring about the necessary conversion or solvent action either in the kneaders or prior to mastication on the rolls. In general, it has been found more satisfactory to assist the plasticizing effect by the addition of very strong mutual solvents in order to complete the conversion of gelatinization as in the case of the camphor pyroxyline combinations when using ordinary solvents.

To overcome these difficulties and produce a compound from pyroxyline and a non-camphor constituent without the employment of solvents other than those ordinarily used in the camphor pyroxyline art, I have found that the desired results may be accomplished by the employment of a new variety of pyroxyline having substantially the same nitrogen content as the pyroxyline of the old art but having a markedly different solubility and viscosity. As an example of the method of producing this new variety of pyroxyline, I employ a nitrating mixture having in 100 parts a composition of substantially 61 parts sulphuric acid, 22 parts by weight of water, the balance nitric acid and the lower oxides usually associated with nitric acid in nitrating mixtures, and using an acid ratio of approximately 71 parts of acid to 1 part of cellulose at an approximate temperature of 100° to 105° F. The nitrating time is from 20 to 40 minutes. At the end of the nitrating period the pyroxyline is removed from the nitrating bath by the ordinary means which are known to those skilled in the art, such as acid wringer, mechanical dumping and drowning and washing in an excess of water until free from acid.

The pyroxyline thus produced is distinguished from the pyroxyline of the old art by the following tests:

A mixture containing from $\frac{1}{20}$ to $\frac{1}{24}$ part of liquid tricresylphosphate to one part of 94% ethyl alcohol should gelatinize in 20 minutes about 50% of the new pyroxyline when tested in a ratio of approximately ⅛ of a gram of the pyroxyline to 15 cubic centimetres of the alcoholic test solution of the tricresylphosphate. Pyroxyline of the old art tested under these conditions would require a concentration of ⅛ to $\frac{1}{15}$ part of the tricresylphosphate to 1 part of the 94% ethyl alcohol to produce a gelatinization of 50% of the pyroxyline in 20 minutes at ordinary room temperature. If this same test is carried on for 1 hour at 70° F., 95% of the pyroxyline of the new art should be dissolved in $\frac{1}{20}$ to $\frac{1}{24}$ solutions, whereas it would require a concentration of ⅛ to $\frac{1}{15}$ to dissolve 95% of the pyroxyline of the old art under the same conditions.

The viscosity test for the pyroxyline of the new art is as follows: 10 grams of the new pyroxyline, suitably washed and dried and dissolved in 112 cc. of a mixture of 100 grams of 98% methyl alcohol and 119 grams of tricresylphosphate should, at a temperature of 70° F. require substantially from 50 to 300 seconds for 25 cc. of a settled clear solution to pass through a round orifice of ¼″ in diameter. The viscosity of pyroxyline of the old art as expressed in seconds when tested according to this method, will be substantially from 600 and 700 to 1500 and 2000 and even higher. The nitrogen content of the pyroxyline of the new art will vary from substantially 10 to 11% nitrogen and pyroxyline of the old art will vary substantially within the same limits. In point of solubility the new pyroxyline requires a tricresylphosphate alcohol solution of substantially but half the strength to produce the same solvent action as pyroxyline of the old art and in point of viscosity the pyroxyline of the new art will have from ⅕ to $\frac{1}{10}$ viscosity of the pyroxyline of the old art with the same solvents.

In the foregoing I have described one method of producing this new variety of pyroxyline which, according to the method of identification as described, will have a tricresylphosphate solubility of from about 20 to 30 and a flow or viscosity of from 50 to 350 as required, whereas the pyroxyline of the old art when tested by this same method will show a tricresylphosphate solubility of from 8 to 15 and a flow of from 500 to 2000 and higher. This new pyroxyline when incorporated with an aromatic phosphate such as tricresylphosphate and with the same solvents such as are usually employed in producing a camphor pyroxyline compound, will produce a product having a degree of toughness, freedom from brittleness and moldability similar to the usual camphor pyroxyline compound, the degree being controlled to a large extent by the amount or proportion of tricresylphosphate. This of course is also true of the camphor pyroxyline compound where the degree of moldability, etc. is controlled by the amount of camphor employed. It is to be understood that in place of the aromatic phosphates I may use other so called camphor substitutes with the new pyroxyline where the deficiency in solvent action may be offset by an increase in the solubility of the pyroxyline.

As an example of the method of procedure in working up this new pyroxyline, I would follow the method outlined in my U. S. Patent #1,233,374, and to the dried cake consisting of the pyroxyline and liquid tricresylphosphate I would add sufficient ethyl alcohol, to produce the required gelatinization or conversion and allow it to stand at the ordinary temperature in a sealed receptacle from 24 to 48 hours or I may substitute for a part of the ethyl alcohol a certain amount of methyl alcohol, say from 10 to 30 parts. The gelatinized mass thus produced is then worked up on rolls or in kneaders and further manipulated according to the methods which are well known to those skilled in the art of manufacturing camphor pyroxyline plastic compounds.

I would ordinarily employ from 20 to 50 parts of an aromatic phosphate, although the invention does not reside in the proportion of aromatic phosphate employed, as I may employ a greater or less amount in proportion to the pyroxyline without departing from the spirit of the invention. For choice of liquid volatile solvent, I may employ from 40 to 70 parts of 95% ethyl alcohol to 100 parts pyroxyline although I may replace part or even all of this solvent with another solvent such as methyl alcohol, ethyl acetate or other similar solvent in various proportions without departing from the spirit of the invention.

I have described one method of producing this variety of pyroxyline and have also described in detail the tests by which it may be identified, but it must be understood that other methods may be employed. Likewise although I have described the invention particularly with reference to such camphor substitutes as the liquid aromatic phosphates, it will be understood that it is applicable in the case of other substances, such for example as triphenylphosphate, paratoluolsulfamid, toluolparaethylsulfamid and substitute anilids, for example ethylacetanilid.

I claim:

1. A pyroxyline adapted to gelatinize as to about 50% of its mass in about twenty minutes in a solvent mixture comprising approximately $\frac{1}{20}$ to $\frac{1}{24}$ part of liquid tricresylphosphate to one part of 94% ethyl alcohol, the proportion of pyroxyline to the solvent mixture being substantially ⅛ of a gram to 15 cubic centimetres, having a viscosity such that 25 cc. of a solution of 10 grams of the pyroxyline in 112 cc. of a mixture of 100 grams of 98% methyl alcohol and 119 grams of tricresylphosphate will pass through a ¼ inch round orifice in the lower end of a test tube containing said solution in less than five hundred seconds.

2. A thermo plastic compound comprising the pyroxyline set forth in claim 1 and a plasticizer therefor comprising tricresylphosphate.

3. A thermo plastic compound comprising the pyroxyline set forth in claim 1 and a plasticizer therefor comprising an aromatic phosphate.

4. A composition comprising the pyroxyline set forth in claim 1 plasticized by a mixture of an aromatic phosphate and a volatile solvent.

5. A process of producing pyroxyline comprising nitrating, approximately one part of cellulose in approximately 71 parts of the mixture of approximately 61 parts of sulphuric acid, 22 parts water and 17 parts nitric acid at approximately a temperature of 100° to 105° Fahrenheit.

WILLIAM G. LINDSAY.